United States Patent Office 3,518,051
Patented June 30, 1970

3,518,051
PREPARATION OF THERMAL STABLE
SYNTHETIC ZEOLITES
Philip K. Maher, Baltimore, and Carl V. McDaniel, Laurel, Md., assignors to W. R. Grace & Co., New York, N.Y., a corporation of Connecticut
No Drawing. Continuation-in-part of application Ser. No. 367,864, May 15, 1964. This application Mar. 19, 1968, Ser. No. 714,357
The portion of the term of the patent subsequent to Dec. 20, 1983, has been disclaimed
Int. Cl. C01b 33/28
U.S. Cl. 23—111                              7 Claims

ABSTRACT OF THE DISCLOSURE

An ultra thermal stable Type X zeolite aluminosilicate having a silica to alumina ratio of 2.5 to 3.5 and a process of making this composition characterized by ammonia ion exchange, followed by calcination at from 1000 to 1400° F. The composition is further characterized by sodium content expressed as the oxide of less than 4 percent.

This application is a continuation-in-part of our earlier application, Ser. No. 367,864, filed May 15, 1964, now abandoned.

This invention relates to new microselective zeolites that have high steam and thermal stability and to the method of preparing these extra stable zeolites.

The microselective adsorbents known as molecular sieves are zeolites, that is crystalline metal aluminosilicates, with three-dimensional structures of silica-alumina tetrahedra. The zeolite structure is characterized by a repeating three-dimensional network of large open aluminosilicate cages interconnected with smaller uniform openings or pores. Certain of these microselective adsorbents have been prepared synthetically from sodium silicate and sodium aluminate. After synthesis, these large cavities are filled with water which can be driven off by heating without collapsing the cage. When dehydrated, these cavities can readsorb large quantities of water and other vapors at low partial pressures. Due to the uniform structures or pore openings connecting the aluminosilicate cavities, these zeolites exhibit the unique property of excluding large molecules from the cavity and allowing smaller molecules to pass through and be adsorbed, thereby acting as microselective adsorbents for molecules according to their size and shape.

It has been shown that adsorbents having an effective pore size of about 4 A. units are of particular interest in adsorbing vapors of low molecular weight materials, such as ethane, ethylene and propylene from mixtures of the same. Other adsorbents having much larger effective pore sizes are also of interest in adsorbing large molecules and storing them for later release. These microselective adsorbents will adsorb molecules whose critical size is less than about 10 to 14 A. units. These materials can function as carriers for a wide variety of chemical compounds. When the chemical compound is needed, it is released by heating the carrier or by displacement of the chemical with another adsorbent such as water. In addition, these zeolites also exhibit the property of base exchange, wherein one metal cation can be exchanged for another, allowing controlled changes in effective pore size.

There has been considerable interest in the use of these molecular sieve materials in the production of catalysts. Certain of these materials have been used in the production of hydrocracking catalysts. So-called "metal loaded" molecular sieves, that is, molecular sieves wherein a portion of the ions have been ion exchanged with certain metals, have been suggested for use in other types of catalytic reactions in organic chemistry.

In copending application Ser. No. 242,892, filed Dec. 7, 1962 and now abandoned, the use of these silica-alumina composites containing zeolitic materials as fluid cracking catalysts is discussed. These catalysts have very desirable cracking properties. Their cracking activity is excellent. The gas producing factors and carbon producing factors are within desirable ranges and the products recovered are those most desirable in refinery operation.

One of the principal problems encountered in incorporating these microselective adsorbents into the silica-alumina fluid cracking catalyst is their general lack of structural stability. This is very important because the regeneration cycle of a fluid cracking catalyst requires the catalyst be able to withstand steam and/or thermal atmospheres in the range of 1300–1700° F. When fluid cracking catalysts are regenerated, the temperature of the catalyst frequently reaches a high level. Any catalytic system that cannot withstand such temperatures loses its catalytic activity on regeneration and its usefulness is greatly impaired.

In the preparation of silica-alumina fluid cracking catalysts by conventional techniques, elaborate methods are prescribed and followed to remove the sodium from the cracking catalyst. In the preparation of synthetic 13% "active" alumina and 25% "active" alumina cracking catalysts, the level of sodium in the final product is reduced to a minimum. This is necessary because the presence of sodium in these catalysts is one of the principal causes of the lack of structural stability at high temperatures.

Most zeolites are prepared or occur naturally in the alkali metal or mixed alkali metal-alkaline earth form. In order to obtain a stable catalyst, it is important that the zeolite be structurally stable. In the application of these materials in cracking catalysts, the zeolite will comprise about 2 to 90% of the resulting composite with the preferred range being about 5 to 25%.

The stabilization of zeolites with a silica to alumina ratio of approximately 3.5–7, is described in our U.S. Pat. No. 3,293,192. It has been believed for some time that it is impossible to stabilize those zeolites having a relatively low silica to alumina ratio of 2.5 to 3.5 U.S. Pat. No. 3,130,006 discusses the problems believed to be inherent in any attempts to stabilize low-silica containing zeolites. In this patent, the patentee states that when the zeolite with a silica to alumina ratio of 2.5±0.5 is converted to the ammonium form and subsequently heated, the zeolite collapses to an amorphous material and loses its internal pore structure and practically all of its X-ray identification.

We have found that contrary to the widely held theories expounded in the prior art patents, as well as in the literature, a unique zeolite composition which is stable to high temperature, thermal and steam treatment can be prepared in which the silica to alumina ratio is 2.5 to 3.5. The zeolite is stable to thermal treatment at temperatures as high as 1650° F. Another distinguishing feature of the unique zeolite composition of our invention is the unit cell size. The unit cell of this composition is smaller than the unit cell of the parent zeolite. This decrease in unit cell size is achieved by the unique stabilization process. The basic formula for our crystalline zeolite may be represented as follows:

$$XM_{2/n}O\cdot Al_2O_3\cdot 2.5-3.5SiO_2\cdot YH_2O$$

where M represents any cation and $n$ is its valence, where Y can vary from 0 to 9, and X from 0 to 0.5. The stabilized zeolite can contain varying amounts of cations or be cation-free. One particularly significant value of our product is the extra stability attained by elimination of the alkali metal ion and the resulting unit cell shrinkage during the stabilization step. In addition to its structural stability at high temperature, the unique product is identified both by its smaller unit cell and the reduction of alkali metal in the crystal structure.

The chemical analysis range of our cation free form of these stabilized zeolites hereinafter referred to as Z–14XS is as follows:

Table I

|  | Wt. percent |
| --- | --- |
| $SiO_2$ (dry basis) | 52 to 64 |
| $Al_2O_3$ (dry basis) | 33 to 46 |
| $Na_2O$ (dry basis) | 0.01 |

Our extra stable zeolite can be prepared by various processes. In one process, the zeolite is stabilized by incremental exchange of the alkali metal ions.

We have found that during one method of preparation of our extra stable zeolite product, the zeolite goes through stages in which it is in the $NH_4+$ form and the $H^+$ form and that it is finally stabilized as Z–14XS, as shown by the unit cell shrinkage and high stability. Under certain conditions, other cations may then be introduced to produce a highly stable cation form of Z–14XS. Suitable cations include complex amine ions, yttrium, the rare earths, aluminum, platinum, other group VIII, I–B, II–B, II–A, III–B, IV–B, V–B, VI–B, VII–B, metal ions, etc., but not the alkali metals.

Although many uses will be suggested to those skilled in the art for our novel zeolite, these products have a particularly useful application as components of catalysts because of their stability, activity and selectivity. Certain of these zeolites do not lose their crystal structure either during thermal calcination at temperatures as high as 1700° F. or steam treatment with 25% steam at a temperature of 1525° F. for 16 hours. This Z–14XS product, like the Z–14US product, described in our U.S. Pat. 3,293,192, is particularly attractive as a component of a fluid cracking catalyst. Other catalytic uses would also be important.

Broadly speaking, one of our novel processes consist of selecting a zeolitic material having a silica to alumina ratio of 2.5 to 3.5 and base exchanging 65% or less (preferably 10 to 65%) of the alkali metal ion with an ammonium salt, amine salt, or other salt, which on calcination decomposes to leave appreciable portion of the zeolite in the hydrogen form. This material is then calcined at temperatures in the order of about 1000 to 1400° F., preferably about 1250° F. to 1350° F., depending on the $Na_2O$ content at the time of calcination. After this treatment, the exchange is repeated so that the sodium is removed in increments of 10 to 80% based on the sodium remaining in the zeolite. Each successive exchange is followed by a calcination as set out above. This exchange and calcination treatment is repeated successively until the $Na_2O$ content is in the proper range, that is less than about 1% by weight, preferably 0.1 to 1.0. After the final exchange, the material is then filtered, washed and given a final stabilization by calcination.

The first step in our process is the selection of a suitable zeolite. The initial zeolites used in the process of the instant application are typically synthetic faujasite zeolites having a silica to alumina ratio of 2.5 to 3.5. Examples of suitable starting zeolites are described in U.S. Pat. 2,882,244 and U.S. Pat. 2,979,381. The latter patent describes a suitable method of preparing this zeolitic material.

The next step of one of our processes is the base exchange of a portion of the sodium in the zeolite with an ammonium salt, amine salt or other salt, which on calcination decomposes to leave appreciable portions of the zeolite in the hydrogen or cation free form. Examples of suitable compounds of this type include ammonium chloride, ammonium sulfate, tetraethyl ammonium chloride, tetramethyl ammonium sulfate, etc. Ammonium salts, because of their ready availability and low cost, are the preferred reagents in this step of the reaction. This exchange is carried out rapidly with a small amount of salt solution. The salt should be present in sufficient quantity to exchange 10 to 65% of the sodium cations initially present in the zeolite. The exchange is carried out rapidly at 100° C. However, temperatures in the range of 25 to 150° C., preferably 50 to 100° C., give satisfactory results. This exchange is carried out until approximately 10 to 65% of the sodium has been exchanged with ammonium. The exchange is complete in a period of about 5 min. to 24 hrs. The longer times have no adverse effect but no advantage is gained by their use.

After the preliminary exchange is completed, the zeolite is filtered, washed and dried. The composite is then calcined or steamed mildly at temperatures in the range of about 1000 to 1400° F. The calcination is preferably carried out at temperatures of about 1250 to 1350° F. for a period of 0.15 to 12 hours at the calcination temperature.

In the remaining steps of the process, this exchange and calcination is repeated until the $Na_2O$ content of the zeolite is reduced to about 0.1 to 1% by wt. A somewhat larger portion of the remaining $Na_2O$ can be removed with each succeeding step as expressed by the relation $$X \geq (.4)^{1.2y}$$

wherein X is the fraction of the original $Na_2O$ remaining, and y is the number of exchanges. To obtain the desired final product $X \leq 0.064$ and $y \geq 3$.

By the term "alkali metal," we intend to include the elements in Group I-A lithium through cesium. By the term "rare earth elements," we intend to include the elements lanthanum to lutecium, atomic numbers 57 to 71.

In addition to its stability, the product of our invention is characterized by the unit cell size, the water adsorption or desiccant properties, and the ion exchange capacity.

The unit cell of our novel product shrinks by about 0.15 to 0.4 A. from the normal 24.80 to 25.00 A. which is characteristic of the zeolitic starting material. This unit cell shrinkage occurs in the repeated stabilization steps.

Unit cell measurements were made on our Z–14XS materials and the unit cell dimensions were noted. This was done using a Norelco X-ray diffractometer with a nickel-filtered copper K radiation. The instrument was operated with 40 kv. operating potential and 20 ma. The sample to be run was mixed with about 10% of a suitable inert internal standard and scanned from about 45° two-theta to about 60° two-theta at a goniometer speed of ¼° per minute and a chart speed of ½ inch per minute. The settings for the electronic circuit panel were as follows for the first diffraction line (sodium chloride):

Scale factor _____ 8
Scale multiplier _____ 1
Time constant _____ 4

The remainder of the scan was obtained at

Scale factor _____ 4
Scale multiplier _____ 1
Time constant _____ 8

At no time during the scan was the goniometer drive or chart drive stopped.

The observed and theoretical (from National Bureau of Standards Circulars) values for the internal standard were used to correct systematic errors in observed values of two-theta.

Our Z–14XS product may be characterized as having a unit cell of 0.15 to 0.4 A. units, less than the parent zeolite and having a silica to alumina ratio of 2.5 to 3.5 and by its thermal stability to high temperature treatment.

The thermal stability of the Z-14XS is demonstrated by the surface area of the product after calcination at temperatures up to 1650° F. and steam treatment with an atmosphere of 25% steam at a temperature of 1525° F. for 16 hours. Our novel product retains a surface area of greater than 100 m.²/g. after this thermal treatment and greater than 200 m.²/g. after the steam treatment described above.

These criteria clearly distinguish this product from the starting non-stabilized zeolite and from other reported non-stabilized zeolites of similar chemical composition.

The invention is further illustrated by the following specific but non-limiting examples.

EXAMPLE I

A synthetic faujasite having a silica to alumina ratio of 2.71 was prepared as follows:

(1) 43.6 g. of Na$_2$O:Al$_2$O$_3$.3H$_2$O was dissolved in 186 g. of water with 32 g. of sodium hydroxide. The solution was cooled to room temperature.

(2) 38.4 g. of fine sized amorphous silica (HiSil) was calcined at 1000° F. for 3 hours and mixed with 228 g. of water.

(3) Solution (1) and mixture (2) were mixed together and aged at room temperature for 4 days.

(4) The mixture was then heated to 100° C. for 6 hours. The solid zeolite was removed by filtration and washed with water.

The product possessed the following characteristics:

Surface area—732 m.²/g.
Na$_2$O—17% by wt.
Al$_2$O$_3$—31.15% by wt.
SiO$_2$—49.59% by wt.
SiO$_2$/Al$_2$O$_3$—2.71
Unit cell—24.85 A.

A 15 g. sample of the above zeolite was ammonium exchanged at 100° C. for 30 minutes in a solution containing 2 g. (NH$_4$)$_2$SO$_4$ dissolved in 100 g. H$_2$O. The zeolite was then recovered by filtration, washed with water, and calcined 2 hours at 1300° F. This procedure was repeated for a total of 6 exchanges with a calcination occurring between each exchange. The results are tabulated in the following:

| Exchange | Na$_2$O (percent by weight) | Surface area (m.²/g.) | Unit cell (A.) |
|---|---|---|---|
| None | 17.0 | 732 | 24.85 |
| 1 | 13.1 | 672 | |
| 2 | 9.4 | 660 | |
| 3 | 5.9 | 468 | |
| 4 | 3.4 | 385 | |
| 5 | 1.7 | 314 | |
| 6 | 0.97 | 284 | 24.67 |

It is seen from the above, the product undergoes a unit cell shrinkage of 0.18 A. The thermal stability of the final product was determined by calcination at 1600° F. for 2 hours whereupon it was found the zeolite retained a surface area of 280 m.²/g. A 2 hour calcination at 1650° F. showed a surface area retention of 205 m.²/g. A sample of the same zeolite, which was not subjected to the present stabilization procedure, was found to retain essentially no surface area upon heating to 1600° F. for 2 hours.

EXAMPLE II

A synthetic faujasite having a silica to alumina ratio of 3.03 was prepared using a procedure similar to that set forth in Example I.

A 100 g. sample of this zeolite was ammonium exchanged with ammonium sulfate solution using a zeolite to ammonium sulfate to water ratio (by wt.) of 1:1:10. The exchange was conducted at 100 C. for 30 minutes. The product was recovered by filtration, washed with water, and calcined for 2 hours at 1300° F. This procedure was repeated for a total of four exchanges with a calcination occurring between each exchange. The results are tabulated below:

| Exchange | Na$_2$O (percent by wt.) | Surface area (m.²/g.) | Surface area (after 2 hrs) at— | | Unit cell, (A). |
|---|---|---|---|---|---|
| | | | 1,650° F. | 1,700° F. | |
| None | 17.0 | 974 | | | 24.76 |
| 1 | 5.98 | 573 | | | |
| 2 | 1.97 | 514 | 27 | | |
| 3 | 0.82 | 464 | 369 | 256 | |
| 4 | 0.29 | 441 | 361 | 298 | 24.54 |

The above data shows that this zeolite underwent a unit cell shrinkage of 0.22 A. and retains substantial surface area after heating at 1700° F. for 2 hours.

EXAMPLE III

A second sample of the zeolite of Example II was exchanged 4 times as set forth in Example II to reduce the Na$_2$O level to 0.38% by wt. However, no calcination was conducted between the exchanges.

The final product after washing was calcined for 6 hours at about 1000° F. The surface area, which was initially 974 m.²/g., was reduced to 10 m.²/g. even though the Na$_2$O content had been reduced to 0.38% by wt.

EXAMPLE IV

A synthetic faujasite having a silica to alumina ratio of 3.04 was prepared by the procedure of Example I using the following ratio of reactants:

3 Na$_2$O:Al$_2$O$_3$:4 SiO$_2$:120 H$_2$O

The final product possessed the following characteristics:

SiO$_2$—50.81% by wt.
Al$_2$O$_3$—28.36% by wt.
Na$_2$O—16.90% by wt.
SiO$_2$/Al$_2$O$_3$—3.04
Surface area—896 m.²/g.

Samples A and B of the above zeolite were exchanged with ammonium sulfate solution using a ratio of zeolite to (NH$_4$)$_2$SO$_4$ to water of 1:1:10. The samples were subjected to calcination as follows:

| Sample | Cal. temp. (° F.) | Time (hr.) | Na$_2$O, percent wt. | Surface area, m.²/g. |
|---|---|---|---|---|
| A | 1,300 | 1 | 5.8 | 603 |
| B | 1,300 | 2 | 5.8 | 557 |

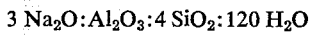

Samples A and B were then exchanged using a zeolite to (NH$_4$)$_2$SO$_4$ to water ratio of 1:2:20; subdivided to form samples A, A2, B1 and B2; and calcined as follows:

| Sample | Na$_2$O | Cal. temp. | Time | Surface area |
|---|---|---|---|---|
| A1 | 1.8 | 1,300 | 1 | 452 |
| A2 | 1.8 | 1,300 | 2 | 497 |
| B1 | 1.7 | 1,300 | 1 | 530 |
| B2 | 1.7 | 1,360 | 2 | 557 |

Samples A2, B1 and B2 were again exchanged using a zeolite to (NH$_4$)$_2$SO$_4$ to water ratio of 1:2:20; subdivided to samples A2-1, A2-2, etc.; and calcined as follows:

| Sample | Na$_2$O | Temp. | Time | Surface area |
|---|---|---|---|---|
| A2-1 | 0.38 | 1,300 | 1 | 442 |
| A2-2 | 0.38 | 1,600 | 2 | 462 |
| A2-3 | 0.38 | 1,650 | 2 | 414 |
| A2-4 | 0.38 | 1,700 | 2 | 319 |
| B1-1 | 0.36 | 1,300 | 2 | 449 |
| B1-2 | 0.36 | 1,600 | 2 | 385 |
| B1-3 | 0.36 | 1,650 | 2 | 344 |
| B1-4 | 0.36 | 1,700 | 2 | 331 |
| B2-1 | 0.32 | 1,300 | 1 | 492 |
| B2-2 | 0.32 | 1,600 | 2 | 391 |
| B2-3 | 0.32 | 1,650 | 2 | 384 |

We claim:
1. A method for preparing a thermally stabilized synthetic faujasite zeolite having a silica to alumina ratio of 2.5 to 3.5 which comprises:
  (a) base exchanging an alkali metal synthetic faujasite zeolite having a silica to alumina ratio of about 2.5 to 3.5 with a solution of a compound selected from the group consisting of salts of ammonia and complex amines to remove about 10 to 65% by weight of the alkali metal content of the zeolite,
  (b) calcining said exchanged zeolite at a temperature of above about 1000° F. and below the thermal collapse temperature of said zeolite for a period of 0.15 to 12 hours,
  (c) cooling said zeolite, and
  (d) successively repeating exchange and calcinations until the Na$_2$O content of said zeolite is less than about 1.0% by weight, and the unit cell of the initial zeolite has been reduced by about 0.15 to 0.4 A.

2. The method of claim 1 wherein said faujasite zeolite has a silica to alumina ratio of about 2.5 to 3.0.

3. The method of claim 1 wherein the base exchange is conducted at a temperature of 50 to 100° C.

4. The method of claim 1 wherein the calcination is conducted at a temperature of 1250 to 1350° F.

5. The method of claim 1 wherein the salt is selected from the group consisting of ammonium chloride, ammonium nitrate, ammonium sulfate, tetraethyl ammonium chloride, and tetraethyl ammonium sulfate.

6. The method of claim 1 wherein the exchanges are carried out in accordance to the relation $$X = (0.4)^{1.2y}$$

wherein X represents the fraction of the initial Na$_2$O present in the zeolite, and y equals the number of exchange steps.

7. The method of claim 6 wherein X is equal to or less than 0.064, and y is equal to or greater than 3.

References Cited

UNITED STATES PATENTS

| | | | |
|---|---|---|---|
| 2,882,244 | 4/1959 | Milton | 23—113 |
| 3,130,006 | 4/1964 | Babo et al. | 23—111 X |
| 3,130,007 | 4/1964 | Breck | 23—113 |
| 3,140,251 | 7/1964 | Plank et al. | 252—455 X |
| 3,287,282 | 11/1966 | Stiles | 23—113 X |
| 3,293,192 | 12/1966 | Maher et al. | 23—111 X |

EDWARD J. MEROS, Primary Examiner

U.S. Cl. X.R.

252—455